United States Patent
Morris (10) Patent No.: US 7,420,480 B2
(45) Date of Patent: Sep. 2, 2008

(54) METHODS, SYSTEMS, AND COMPUTER PROGRAM PRODUCTS FOR ITERATIVELY PROVIDING FEEDBACK VIA A USER INTERFACE FOR MULTI-CHARACTER, MULTI-MODE ALPHANUMERIC DATA ENTRY

(75) Inventor: Robert P. Morris, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 176 days.

(21) Appl. No.: 11/314,271

(22) Filed: Dec. 21, 2005

(65) Prior Publication Data
US 2007/0139226 A1    Jun. 21, 2007

(51) Int. Cl.
*H03M 11/00* (2006.01)

(52) U.S. Cl. .............. 341/27; 341/20; 341/26; 341/21; 341/23; 708/136; 708/145; 715/701

(58) Field of Classification Search .......... 341/20, 341/22, 23, 26, 21, 27; 345/168; 708/145, 708/136; 715/701; 704/270
See application file for complete search history.

(56) References Cited

U.S. PATENT DOCUMENTS

| | | | |
|---|---|---|---|
| 4,185,169 A | 1/1980 | Tanimoto et al. | |
| 4,185,170 A | 1/1980 | Morino et al. | |
| 4,249,245 A | 2/1981 | Nakanishi et al. | |
| 4,334,280 A | 6/1982 | McDonald | |
| 4,885,565 A | 12/1989 | Embach | |
| 5,007,008 A * | 4/1991 | Beers | 708/145 |
| 5,311,175 A | 5/1994 | Waldman | |
| 5,451,924 A | 9/1995 | Massimino et al. | |
| 5,619,180 A | 4/1997 | Massimino et al. | |
| 6,043,761 A | 3/2000 | Burrell, IV | |
| 6,218,966 B1 | 4/2001 | Goodwin et al. | |
| 6,310,428 B1 | 10/2001 | Pulli et al. | |
| 6,525,676 B2 | 2/2003 | Kisaichi et al. | |
| 6,606,486 B1 | 8/2003 | Cubbage et al. | |
| 2003/0025618 A1 | 2/2003 | Burrell, IV | |
| 2004/0165924 A1 | 8/2004 | Griffin | |
| 2004/0177128 A1 * | 9/2004 | Northway | 709/217 |
| 2004/0196256 A1 | 10/2004 | Wobbrock et al. | |
| 2005/0156892 A1 * | 7/2005 | Grant | 345/167 |

OTHER PUBLICATIONS

ZDNN Staff, "Mozilla Takes on Microsoft.NEt," ZDNet News, pp. 1-5 (Feb. 4, 2001).
"T9," http://www.t9.com/, pp. 1-2 (Copyright 2005).
Lorenzo, "Keypad Text Entry White Paper," www.ventris.com, pp. 1-8 (Copyright 2003).
"Delta II: The Right Cell Phony Keypad Matrix for the 21st Century," http://www.chicagologic.com/index.htm, pp. 1-3 (publication date unknown).

* cited by examiner

Primary Examiner—Albert K Wong (57) ABSTRACT

Disclosed are methods, systems, and computer program products for receiving input from a multi-function momentary switch by providing feedback from a user interface for each function associated with the switch. According to one method, alphanumeric input values are associated with a momentary switch. Each of the alphanumeric input values is associated with a different active time duration for the switch and at least two of the alphanumeric input values are associated with a same alphanumeric text entry mode. A duration of time the switch is in the active state is monitored. At least one of tactile and audible feedback is provided each time the duration of time matches a duration associated with an alphanumeric input value. The alphanumeric input value associated with the alphanumeric text entry mode and duration for the last feedback provided is selected as input from the switch.

24 Claims, 4 Drawing Sheets

METHODS, SYSTEMS, AND COMPUTER PROGRAM PRODUCTS FOR ITERATIVELY PROVIDING FEEDBACK VIA A USER INTERFACE FOR MULTI-CHARACTER, MULTI-MODE ALPHANUMERIC DATA ENTRY

TECHNICAL FIELD

The subject matter described herein relates to alphanumeric character entry using a multi-function keypad interface. More particularly, the subject matter described herein relates to methods, systems, and computer program products for iteratively providing feedback via a user interface for multi-character, multi-mode alphanumeric data entry.

BACKGROUND

Figure 1:
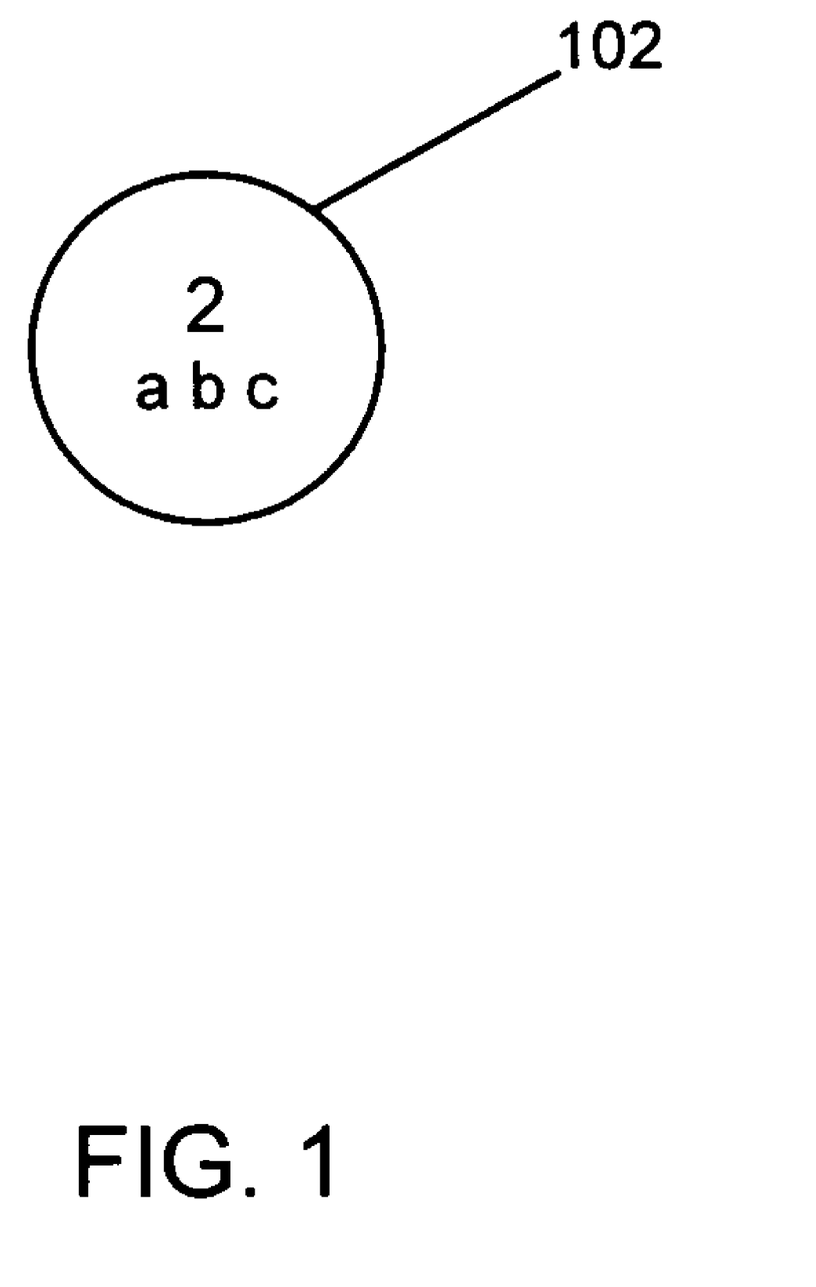
FIG. 1 is an illustration of an exemplary multi-mode, multi-character, input key according to an embodiment of the subject matter described herein.

User interfaces for handheld devices and other devices that utilize a small form factor for a data keypad or touch pad interface are becoming more and more prominent in the electronics marketplace. The small form factor associated with the keypad or touch pad interface has resulted in a user interface where multiple functions are associated with each key of the keypad or touch pad interface. Each key is typically assigned multiple entry modes and multiple character possibilities for each entry mode. For example, FIG. 1 illustrates an exemplary input key for such a user interface. As can be seen from FIG. 1, input key 102 may be used to enter two different modes of characters. Both alpha-mode and numeric-mode characters may be entered with input key 102. For the alpha mode, three alpha characters, the letters "a," "b," and "c," may be entered. For the numeric mode data entry, the numeral "2" may be entered. As user interfaces that use smaller form factors for data entry become denser through the provisioning of more user modes, the number of modes and character availability will also increase.

Unfortunately, traditional multi-function keys associated with these small form factor devices require multiple key presses to iterate through the available characters for each mode of data entry. These "multi-tap" keys require a user to press and release an input key, such as input key 102, for each character selection. Further, when a user wishes to enter multiple characters associated with the same input key 102, the user must wait a specified, and usually lengthy, debounce period between each sequential depression of input key 102. This debounce period is typically long enough to allow a user to depress and release the multi-tap keys without accepting a new character input for each depression of input key 102 so that the user may repeatedly tap the input key to iterate through the character choices. Unfortunately, this debounce period is often so long that when a user wishes to enter multiple characters associated with the same multi-tap key, the user must wait the entire debounce period in order to preserve a character selection. If the user does not wait long enough and presses the key again, the user interface cycles to the next character in the sequence instead of preserving the last character entered. The user then has to iterate through all available characters again in order to select the desired character for the current position in the input sequence. The user must then wait another debounce period before depressing the multi-tap key again in order to begin entry for the next character in the input character sequence. This proves to be a burdensome arrangement often frustrating character entry.

Some interfaces allow the user to press and hold a key to alternate between alpha entry modes and numeric entry modes. This is unsatisfactory because it still requires the user to enter a multi-tap input mode in order to iterate through the available characters for a given mode of input.

Predictive text entry uses a dictionary lookup feature coupled with a multi-tap character selection. Predictive text entry has become popular but is plagued by user confusion as users attempt to determine when to deviate from multi-tap entry mode and search a dictionary for the correct word based upon a few characters entered. Though training the devices may be possible, words that users enter in the dictionary still may only be accessible when the user transitions from a multi-tap entry mode to a dictionary lookup mode. This transition from a multi-tap entry mode to a dictionary lookup mode tends to break a user's train of thought and slows the data entry. Likewise, as word databases grow, users will have more selections to choose from within the dictionary and may be burdened with a longer lookup time than an alternative data entry time.

Because of the problems described above, traditional systems for multi-function keypad entry are complex and force a user to conform to limitations of the user interface. Accordingly, in light of these difficulties associated with conventional multi-character multi-mode data entry, there exists a need for improved methods, systems, and computer program products for iteratively providing feedback via a user interface for multi-character, multi-mode alphanumeric data entry.

SUMMARY

According to one aspect, the subject matter described herein comprises methods, systems, and computer program products for receiving input from a multiple-function momentary switch by providing feedback from a user interface for each function associated with the switch. One method includes associating a plurality of alphanumeric input values with a momentary switch. The switch includes an inactive state at rest and an active state when pressure is applied. Each of the plurality of alphanumeric input values are associated with a different active time duration for the switch and at least two of the plurality of alphanumeric input values are associated with a same alphanumeric text entry mode. The method includes determining when the switch transitions from the inactive state to the active state. In response to determining that the switch transitioned from the inactive state to the active state, a duration of time in the active state is determined. At least one of tactile and audible feedback is provided each time the duration of time matches an active time duration associated with an alphanumeric input value. When it is determined that the switch transitions from the active state to the inactive state, the alphanumeric input value associated with the alphanumeric text entry mode and duration for the last feedback provided is selected as input from the switch.

The subject matter described herein providing iterative feedback via a user interface for multi-character multi-mode alphanumeric data entry may be implemented using a computer program product comprising computer executable instructions embodied in a computer-readable medium. Exemplary computer-readable media suitable for implementing the subject matter described herein include chip memory devices, disk memory devices, programmable logic devices, application specific integrated circuits, and downloadable electrical signals. In addition, a computer-readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

In view of the problems described above with respect to multi-character multi-mode data entry, the subject matter described herein provides for eliminating the multi-tap approach to character entry and the associated debounce problems by allowing a single-press, multi-character, multi-mode selection capability. Where previously the multi-tap entry mode was required for at least a portion of all data entry, the methods, systems, and computer program products described herein receive input from a multiple-function momentary switch and provide feedback from a user interface for each function associated with the switch. By adapting the user interface to accept single-press entry of characters and to sequentially provide feedback for each character associated with a multi-function input key, the user interface may flow more smoothly and may allow for a more rhythmic character entry as users learn to respond to feedback for each character and each entry mode.

Figure 2:
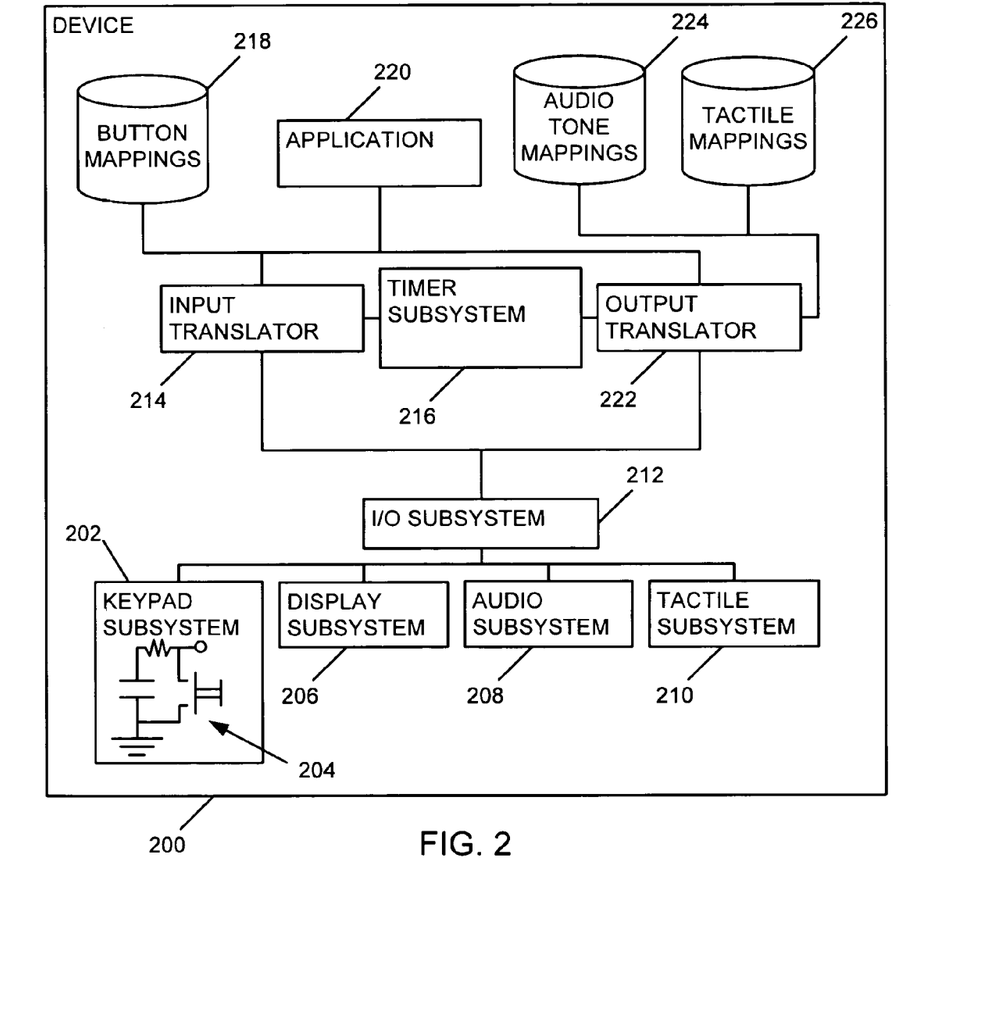
FIG. 2 is a block diagram of an exemplary device for performing single-press, multi-character, multi-mode data entry according to an embodiment of the subject matter described herein.

FIG. 2 illustrates an exemplary user-interface device 200 for performing single-press, multi-character, multi-mode data entry. Device 200 may be a computer, a mobile phone, a PDA, or any other device that includes a user input interface. In the illustrated example, device 200 includes a keypad subsystem 202. Keypad subsystem 202 may be used for data entry on device 200 and may include one or more momentary input key switches. In FIG. 2, a single momentary input key switch 204 (hereinafter input key 204) is shown for simplicity. It is understood that a device may include more than one input key. Input key 204 may include a mechanical key or a touch pad. Many other types of momentary switches may also be used in keypad subsystem 202. For purposes of illustration, input key 204 is assumed to be a momentary switch with an inactive state at rest and an active state when depressed. Input key 204 is also assumed to be properly debounced within keypad subsystem 202 so that electrical inconsistencies related to a transition from an inactive state to an active state, or vica versa, are properly disregarded and that an activation or deactivation of input key 204 will result in a single activation or deactivation event without any second-incident switching characteristics propagated beyond keypad subsystem 202.

A display subsystem 206 may be used to echo user input and to provide visual cues and information to a user of device 200. Display subsystem 206 may include a character-based liquid crystal display (LCD), a graphics-capable LCD, a light-emitting diode (LED) subsystem, or any other subsystem capable of providing visual feedback to a user of device 200.

An audio subsystem 208 may include speakers, beepers, or any other type of audio components capable of providing audible feedback to a user of device 200. Tactile subsystem 210 may include electromechanical transducers, mechanical resonators, or any other tactile subsystem capable of providing tactile feedback to a user of device 200.

An input/output (I/O) subsystem 212 may be used to interface keypad subsystem 202, display subsystem 206, audio subsystem 208, and tactile subsystem 210 to the rest of the system. I/O subsystem 212 may include both hardware interface components and low-level drivers for interfacing to the respective subsystems.

An input translator 214 may be used to translate inputs associated with keypad subsystem 202 into input character values. When a user of device 200 depresses a momentary key switch, such as input key 204, of keypad subsystem 202, a timer from a timer subsystem 216 may be started to time the duration that input key 204 is in an active state. In contrast to traditional multi-tap keypad entry where the user was required to depress and release a momentary input key for each character selection, a user of device 200 may perform a single-press entry whereby the duration of input key 204 in an active state may be used to determine both the mode of text entry and the character to be entered in that mode. Accordingly, input translator 214 may use timer subsystem 216 and character mappings stored in a button mappings database 218 to correlate active input key 204 time values with character mappings.

When an active time value is determined by input translator 214 to match an input character duration for input key 204 within button mappings database 218, the associated input character may be selected from button mappings database 218 and passed to application 220. The timer may remain running until an input key 204 deactivation event is detected within keypad subsystem 202 and passed to input translator 214 via I/O subsystem 212.

As will be described in more detail below, a character may be selected from button mappings database 218 and passed to an application 220. The character may or may not be the final input character for a given position in the input data sequence. Application 220 may operate on the character by temporarily storing the character as part of an input data character sequence and may echo the character back to a user of device 200 on display subsystem 206 by use of output translator 222. In this type of character echo mode, output translator 222 may pass the character representation via I/O subsystem 212 to display subsystem 206 to provide visual feedback to a user that the character was accepted temporarily into the data input stream.

As part of the single-press, multi-character, multi-mode input capabilities of device 200, output translator 222 may also be used to provide visual, audible, and tactile feedback to a user of device 200 during a single-press character entry sequence. For providing feedback, output translator 222 may communicate with timer subsystem 216 to monitor time durations for a single press of input key 204. Output translator 222 may also access button mappings database 218 to determine input characters that are associated with active input key 204 durations. When input key 204 within keypad subsystem 202 is depressed and the timer is started by input translator 214, output translator 222 may monitor the time and compare the active duration for input key 204 with character values within button mappings database 218.

As described above, application 220 may populate display subsystem 206 by echoing the first character associated with input key 204 within keypad subsystem 202. Output translator 222 may also offload application 220 by performing the echo function when timer durations are found by input translator 214 to match characters associated with input key 204 within button mappings database 218. Further, when input key 204 remains active for a duration of time that matches a second character associated with input key 204 and stored within button mappings database 218, feedback may be provided to the user of device 200 by any of display subsystem 206, audio subsystem 208, and tactile subsystem 210. When display subsystem 206 is to be used for user feedback, output translator 222 may pass the second character representation associated with input key 204 from input translator 214 or application 220 to display subsystem 206 via I/O subsystem 212. Application 220 may temporarily store the second and subsequent characters to the current position of the input sequence until input key 204 is released, as will be discussed in more detail below.

An audio tone mappings database 224 may store audio tones to be played to the user in response to transitions between characters in the active mode of input key 204. Audio tone mappings database 224 may include audio representations for each character stored in button mappings database 218. Audio representations for some or all of the different characters may be the same according to one aspect, or may be different according to another aspect. When a duration of time associated with a second or subsequent input character associated with input key 204 is determined by output translator 222 to match a value associated with the second or subsequent character, an associated tone mapping for the character may be passed to audio subsystem 208 via I/O subsystem 212. This tone mapping may be in the form of a driver frequency value for a speaker, a pitch value associated with a buzzer, or any other mapping usable by a subsystem, such as an audio subsystem 208, to provide feedback to indicate that a second or subsequent character associated with input key 204 is now the selected character.

A tactile mappings database 226 may store values associated with characters stored in button mappings database 218. These tactile mappings may be used by output translator 222 and passed to tactile subsystem 210 via I/O subsystem 212 as each of the second and subsequent characters for input key 204 match a duration of time for an active state of input key 204 represented in button mappings database 218. Tactile values for some or all of the different characters may be the same according to one aspect, or may be different according to another aspect. Tactile mappings database 226 may include driver frequencies for an electromechanical transducer within tactile subsystem 210, or any other tactile mapping usable by tactile subsystem 210 to provide feedback to a user as each of the second and subsequent characters associated with input key 204 are selected.

It should be noted that output translator 222 may access either of audio tone mappings database 224 or tactile mappings database 226 for active time duration values associated with the active input key 204 duration without departing from the scope of the subject matter described herein.

Device 200 may be used for alphanumeric text entry modes including, for example, a lower case mode, an upper case mode, a number mode, and a punctuation mode. Alphanumeric entry may include using letters, numbers, punctuation marks, mathematical operators, and other symbols. Accordingly, device 200 may be used to enter multiple characters in multiple modes with a single activation, a "single-press," of a momentary input switch, such as input key 204.

Figure 3:
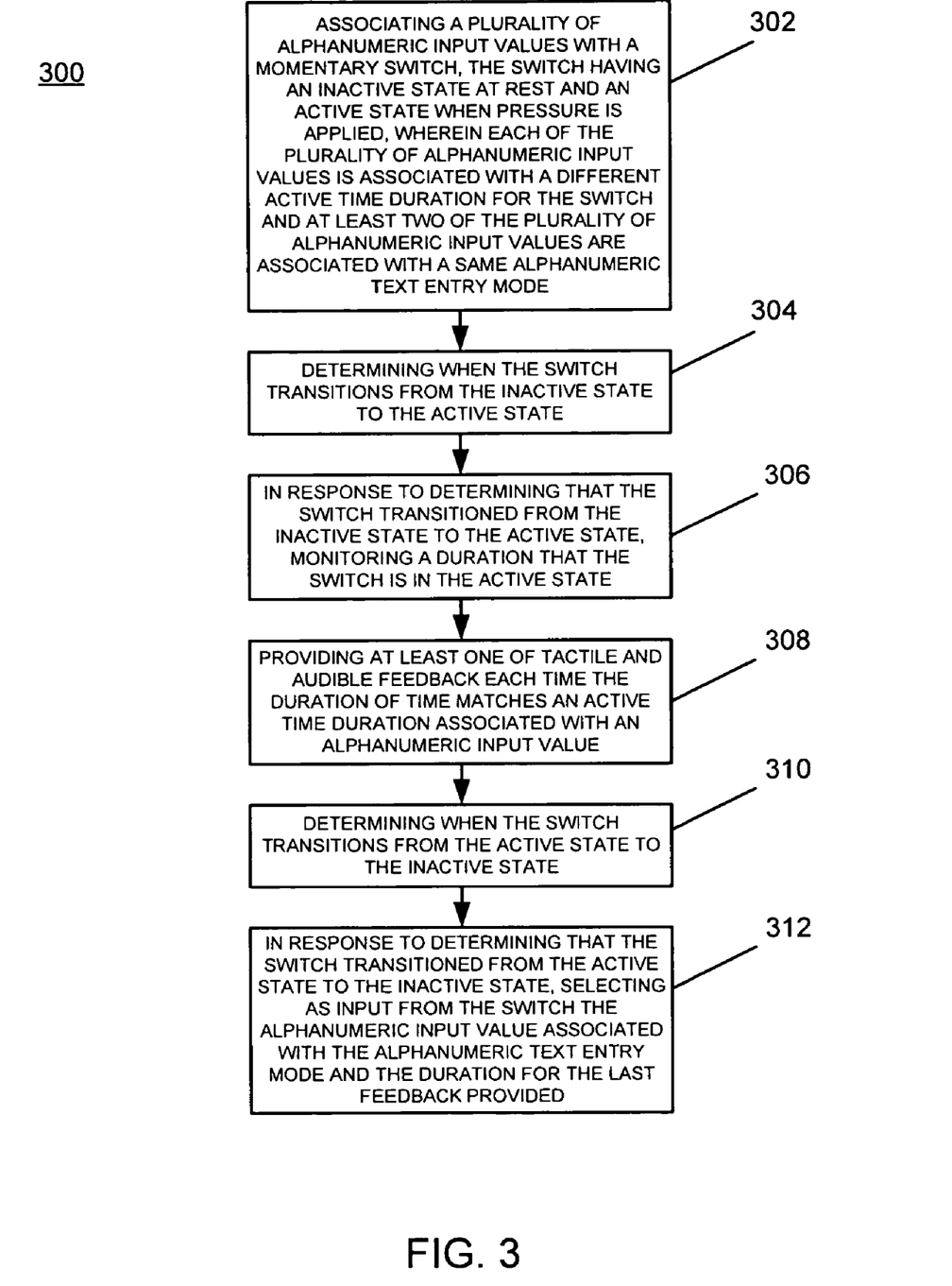
FIG. 3 is a flow chart of a single-press data entry process by which multi-character, multi-mode, data entry using a single momentary input switch may be performed according to an embodiment of the subject matter described herein.

FIG. 3 illustrates an exemplary single-press data entry process 300 for multi-character, multi-mode data entry using a single momentary input switch, such as input key 204. At block 302, a plurality of alphanumeric input values are associated with a momentary switch. The switch has an inactive state at rest and an active state when pressure is applied. Each of the plurality of alphanumeric input values is associated with a different active time duration for the switch and at least two of the plurality of alphanumeric input values are associated with a same alphanumeric text entry mode. For example, an input key, such as input key 102, may be associated with alphanumeric input values from three modes of alphanumeric text entry: a lower-case alpha entry mode (e.g., "a," "b," and "c,"), an upper-case alpha mode (e.g., "A," "B," and "C,"), and a numeric entry mode (e.g., "2"). The single-press data entry process 300 described herein may provide for a selection between, for example, alphanumeric input values "a," "b," and "c," "A," "B," and "C," and "2" with a single-press of a key. Each alphanumeric input value corresponds to a different active time duration. Input key 102 may alternatively be associated with alphanumeric input values from a single mode of alphanumeric text entry. Other key configurations and modes are possible, as described above.

At block 304, single-press data entry process 300 determines when the switch transitions from the inactive state to the active state. In response to determining that switch transitions from the inactive state to the active state, a duration of time that the switch is in the active state is monitored at block 306. At block 308, at least one of tactile and audible feedback is provided each time the duration of time matches an active time duration associated with an alphanumeric input value. For example, audible feedback may include a constant pitch, an increasing pitch, a decreasing pitch, or any other tonal variation each time the active time duration matches an associated alphanumeric input value. Similarly, tactile feedback may include an electromechanical transducer actuated with a constant frequency of activation, an increasing frequency of activation, a decreasing frequency of activation, or any other tactile variation each time the active time duration matches an associated alphanumeric input value. Using the example in the preceding paragraph, in the alpha mode, "a" may correspond to one frequency, "b" may correspond to a different frequency, and "c" may correspond to another frequency, and so on, in an embodiment in which audible feedback is provided.

At block 310, single-press data entry process 300 determines when the switch transitions from the active state to the inactive state. In response to determining that the switch transitions from the active state to the inactive state, the alphanumeric input value associated with the alphanumeric text entry mode and duration for the last feedback provided is selected as input from the switch at block 312. For example, if the last feedback provided was the feedback for character "b," then "b" will be selected as input from the switch.

Figure 4:
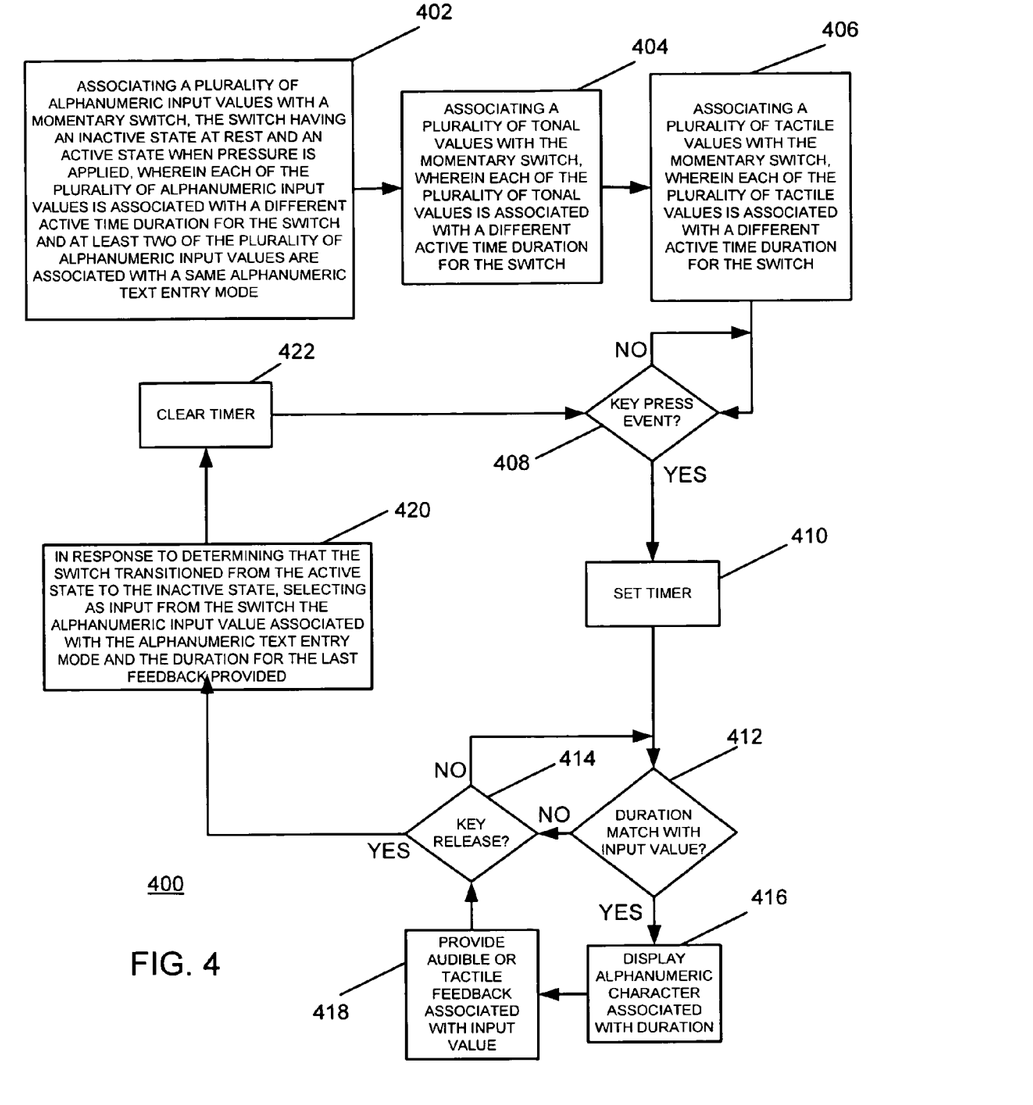
FIG. 4 is a flow chart of a single-press data entry process by which character input values may be associated with an active time duration for a momentary multi-character, multi-mode, data entry switch, according to an embodiment of the subject matter described herein.

FIG. 4 illustrates an exemplary single-press data entry process 400 for associating character input values with an active time duration for a momentary multi-character, multi-mode data entry switch, such as input key 204. At block 402, a plurality of alphanumeric input values may be associated with a momentary switch. The switch may have an inactive state at rest and an active state when pressure is applied. Each of the plurality of alphanumeric input values is associated with a different active time duration for the switch and at least two of the plurality of alphanumeric input values are associated with the same alphanumeric text entry mode. For example, an input key, such as input key 102, may have multiple modes of alphanumeric text entry, as described above.

At block 404, single-press data entry process 400 may associate a plurality of tonal values with the momentary switch. Each of the plurality of tonal values is associated with a different active time duration for the switch. At block 406, single-press data entry process 400 may associate a plurality of tactile values with the momentary switch. Each of the plurality of tactile values is associated with a different active time duration for the switch. For example, tonal values may include representations for a constant pitch, an increasing pitch, a decreasing pitch, or any other tonal variation for each active time duration associated with the switch. Similarly, tactile values may include representations by which an electromechanical transducer may be actuated with a constant frequency of activation, an increasing frequency of activation, a decreasing frequency of activation, or any other tactile variation for each active time duration associated with the switch. Using the example in the preceding paragraph, in the alpha mode, "a" may correspond to one frequency, "b" may correspond to a different frequency, and "c" may correspond to another frequency, in an embodiment in which audible feedback is provided.

At decision point 408, single-press data entry process 400 may wait for a key press event. This determination at decision point 408 may be made by either polling the key or receiving an interrupt indicating a key press event. When a key press event occurs, a timer may be set at block 410. At decision point 412, a determination may be made as to whether the duration of the key press as represented by the timer value set in block 410 matches an input value associated with the input key. When there is a not a match, a determination may be made at decision point 414 as to whether the key has been released. This determination at decision point 414 may be made by either polling the key or receiving an interrupt indicating a key release event. Many other switch interface methods are possible. Accordingly, all are considered within the scope of the subject matter described herein.

When a determination is made at decision point 412 that the duration of the timer, and thereby the key press duration, matches an input value associated with the input key, an alphanumeric character associated with the duration may be displayed at block 416. As well, an icon or another visual representation may be displayed to indicate that single-press data entry process 400 is iterating through character input values. At block 418, audible or tactile feedback associated with the input value may be provided, and single-press data entry process 400 may return to decision point 414 to determine whether the input key has been released. Processing may continue in the fashion described above until the input key is determined to have been released at decision point 414. When a determination has been made at decision point 414 that the key has been released, single-press data entry process 400 may transition to block 420 where, in response to determining that the switch transitioned from the active state to the inactive state, the alphanumeric input value associated with the alphanumeric text entry mode and duration for the last feedback provided may be selected as input from the switch. For example, if the last feedback provided was the feedback for character "b," then "b" will be selected as input from the switch. At block 422, the timer may be cleared and single-press data entry process 400 may return to decision point 408 to await another key press event.

A system for receiving input from a multiple-function momentary switch by providing feedback from a user interface for each function associated with the switch includes means for associating a plurality of alphanumeric input values with a momentary switch. The switch has an inactive state at rest and an active state when pressure is applied. Each of the plurality of alphanumeric input values is associated with a different active time duration for the switch and at least two of the plurality of alphanumeric input values are associated with a same alphanumeric text entry mode. For example, in FIG. 2, button mappings database 218 may associate a plurality of alphanumeric input values with momentary input key switch 204. Momentary input key switch 204 may have an inactive state at rest and an active state when pressure is applied. Each of the plurality of alphanumeric input values is associated with a different active time duration for momentary input key switch 204 and at least two of the plurality of alphanumeric input values are associated with a same alphanumeric text entry mode.

The system also includes means for determining when the switch transitions from the inactive state to the active state. For example, in FIG. 2, keypad subsystem 202, I/O subsystem 212, and input translator 214 may each be configured to determine when momentary input key switch 204 transitions from the inactive state to the active state.

The system also includes means for, in response to determining that the switch transitioned from the inactive state to the active state, timing a duration of time in the active state. For example, in FIG. 2, timer subsystem 216 may be used by input translator 214 to time a duration of time that momentary input key switch 204 is in the active state.

The system also includes means for providing at least one of tactile and audible feedback each time the duration of time matches an active time duration associated with an alphanumeric input value. For example, in FIG. 2, output translator 222 may provide tactile feedback by use of tactile mappings database 226 and tactile subsystem 210, and may provide audible feedback by use of audio tone mappings database 224 and audio subsystem 208.

The system also includes means for determining when the switch transitions from the active state to the inactive state. For example, as discussed above, in FIG. 2, keypad subsystem 202, I/O subsystem 212, and input translator 214 may each be configured to determine when momentary input key switch 204 transitions from the active state to the inactive state.

The system also includes means for, in response to determining that the switch transitioned from the active state to the inactive state, selecting as input from the switch the alphanumeric input value associated with the active time duration for the last feedback provided. For example, in FIG. 2, input translator 214 may select as input from momentary input key switch 204 the alphanumeric input value associated with the active time duration for the last feedback provided from button mappings database 218.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for receiving input from a multiple-function momentary switch by providing feedback from a user interface for each function associated with the switch, the method comprising:

associating a plurality of alphanumeric input values with a momentary switch, the switch having an inactive state at rest and an active state when pressure is applied, wherein each of the plurality of alphanumeric input values is associated with a different active time duration for the switch, at least two of the plurality of alphanumeric input values are associated with a same alphanumeric text entry mode and at least two of the plurality of alphanumeric input values being associated with different alphanumeric text entry modes, wherein the alphanumeric text entry modes include an uppercase text entry mode and a lowercase text entry mode;

determining when the switch transitions from the inactive state to the active state;

in response to determining that the switch transitioned from the inactive state to the active state, monitoring a duration that the switch is in the active state;

providing at least one of tactile and audible feedback each time the duration matches an active time duration associated with an alphanumeric input value;

determining when the switch transitions from the active state to the inactive state; and in response to determining that the switch transitioned from the active state to the inactive state, selecting, from the alphanumeric input values associated with the same and different alphanumeric text entry modes, as input from the switch the alphanumeric input value associated with one of the alphanumeric text entry modes based on the duration.

2. The method of claim 1 comprising associating a plurality of audio feedback values with the switch, wherein each of the plurality of audio feedback values is associated with a different active time duration for the switch and wherein at least one of the plurality of audio feedback values is used to provide the audible feedback.

3. The method of claim 1 wherein providing the at least one of tactile and audible feedback includes providing the audible feedback using a speaker.

4. The method of claim 1 wherein providing the at least one of tactile and audible feedback includes providing the audible feedback using a buzzer.

5. The method of claim 1 comprising associating a plurality of tactile feedback values with the switch, wherein each of the plurality of tactile feedback values is associated with a different active time duration for the switch and wherein at least one of the plurality of tactile feedback values is used to provide the tactile feedback.

6. The method of claim 1 wherein providing the at least one of tactile and audible feedback includes providing the tactile feedback using an electromechanical transducer.

7. The method of claim 1 wherein providing the at least one of tactile and audible feedback includes providing the tactile feedback using a mechanical resonator.

8. The method of claim 1 comprising debouncing the switch to reduce second-incident switching.

9. The method of claim 1 wherein monitoring a duration that the switch is in the active state includes setting a timer in response to determining that the switch transitioned from the inactive state to the active state.

10. The method of claim 9 comprising clearing the timer in response to determining that the switch transitioned from the active state to the inactive state.

11. A system for receiving input from a multiple-function momentary switch by providing feedback from a user interface for each function associated with the switch, the system comprising:

a momentary switch, the switch having an inactive state at rest and an active state when pressure is applied;

a button mappings database adapted to associate a plurality of alphanumeric input values with the switch, wherein each of the plurality of alphanumeric input values is associated with a different active time duration for the switch and at least two of the plurality of alphanumeric input values are associated with a same alphanumeric text entry mode;

a timer adapted to monitor an active time duration for the switch;

an output translator adapted to provide at least one of tactile and audible feedback each time the active time duration of the switch matches an active time duration associated with an alphanumeric input value and at least two of the plurality of alphanumeric input values being associated with different alphanumeric text entry modes, wherein the alphanumeric text entry modes include an uppercase text entry mode and a lowercase text entry mode; and an input translator adapted to select from the alphanumeric input values associated with the same and different alphanumeric text entry modes, as input from the switch, the alphanumeric input value associated with one of the alphanumeric text entry modes and the monitored active time duration.

12. The system of claim 11 comprising an audio tone mappings database adapted to associate a plurality of audio feedback values with the switch, wherein each of the plurality of audio feedback values is associated with a different active time duration for the switch.

13. The system of claim 12 wherein the output translator is adapted to utilize the audio feedback value associated with the active time duration monitored by the timer to provide the audio feedback each time the active time duration monitored by the timer matches the active time duration associated with the audio feedback value.

14. The system of claim 11 comprising a tactile mappings database adapted to associate a plurality of tactile feedback values with the switch, wherein each of the plurality of tactile feedback values is associated with a different active time duration for the switch.

15. The system of claim 14 wherein the output translator is adapted to utilize the tactile feedback value associated with the active time duration monitored by the timer to provide the tactile feedback each time the active time duration monitored by the timer matches the active time duration associated with the tactile feedback value.

16. The system of claim 11 comprising a speaker, wherein the output translator is adapted to provide the audible feedback using the speaker.

17. The system of claim 11 comprising a buzzer, wherein the output translator is adapted to provide the audible feedback using the buzzer.

18. The system of claim 11 comprising an electromechanical transducer, wherein the output translator is adapted to provide the tactile feedback using the electromechanical transducer.

19. The system of claim 11 comprising a mechanical resonator, wherein the output translator is adapted to provide the tactile feedback using the mechanical resonator.

20. The system of claim 11 wherein the input translator is adapted to debounce transitions between the inactive state and the active state of the switch to reduce second-incident switching.

21. The system of claim 11 wherein the input translator is adapted to set the timer to time a duration of time in the active state in response to determining that the switch transitioned from the inactive state to the active state.

22. The system of claim 21 wherein the input translator is adapted to clear the timer in response to determining that the switch transitioned from the active state to the inactive state.

23. A system for receiving input from a multiple-function momentary switch by providing feedback from a user interface for each function associated with the switch, the system comprising:

- means for associating a plurality of alphanumeric input values with a momentary switch, the switch having an inactive state at rest and an active state when pressure is applied, wherein each of the plurality of alphanumeric input values is associated with a different active time duration for the switch, at least two of the plurality of alphanumeric input values are associated with a same alphanumeric text entry mode and at least two of the plurality of alphanumeric input values being associated with different alphanumeric text entry modes, wherein the alphanumeric text entry modes include an uppercase text entry mode and a lowercase text entry mode;
- means for determining when the switch transitions from the inactive state to the active state;
- means for, in response to determining that the switch transitioned from the inactive state to the active state, monitoring a duration that the switch is in the active state;
- means for providing at least one of tactile and audible feedback each time the duration matches an active time duration associated with an alphanumeric input value;
- means for determining when the switch transitions from the active state to the inactive state; and
- means for, in response to determining that the switch transitioned from the active state to the inactive state, selecting from the alphanumeric input values associated with the same and different alphanumeric text entry modes, as input from the switch the alphanumeric input value associated with one of the alphanumeric text entry modes based on the duration.

24. A computer program product comprising computer-executable instructions embodied in a computer-readable medium for performing steps comprising:

- associating a plurality of alphanumeric input values with a momentary switch, the switch having an inactive state at rest and an active state when pressure is applied, wherein each of the plurality of alphanumeric input values is associated with a different active time duration for the switch, at least two of the plurality of alphanumeric input values are associated with a same alphanumeric text entry mode and at least two of the plurality of alphanumeric input values being associated with different alphanumeric text entry modes, wherein the alphanumeric text entry modes include an uppercase text entry mode and a lowercase text entry mode;
- determining when the switch transitions from the inactive state to the active state;
- in response to determining that the switch transitioned from the inactive state to the active state, monitoring a duration that the switch is in the active state;
- providing at least one of tactile and audible feedback each time the duration matches an active time duration associated with an alphanumeric input value;
- determining when the switch transitions from the active state to the inactive state; and
- in response to determining that the switch transitioned from the active state to the inactive state, selecting from the alphanumeric input values associated with the same and different alphanumeric text entry modes, as input from the switch the alphanumeric input value associated with one of the alphanumeric text entry modes based on the duration.

* * * * *